United States Patent
Sasaki

(10) Patent No.: US 8,675,771 B2
(45) Date of Patent: Mar. 18, 2014

(54) LOG LIKELIHOOD RATIO ARITHMETIC CIRCUIT, TRANSMISSION APPARATUS, LOG LIKELIHOOD RATIO ARITHMETIC METHOD, AND PROGRAM

(75) Inventor: Eisaku Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1420 days.

(21) Appl. No.: 12/083,234

(22) PCT Filed: Sep. 29, 2006

(86) PCT No.: PCT/JP2006/068925
§ 371 (c)(1),
(2), (4) Date: Apr. 8, 2008

(87) PCT Pub. No.: WO2008/038749
PCT Pub. Date: Apr. 3, 2008

(65) Prior Publication Data
US 2010/0150268 A1    Jun. 17, 2010

(30) Foreign Application Priority Data
Sep. 29, 2006  (JP) ................................. 2006-266523

(51) Int. Cl.
*H04L 27/36*   (2006.01)
(52) U.S. Cl.
USPC ........................................ 375/298; 375/341
(58) Field of Classification Search
USPC .................... 375/332, 340, 341, 298
See application file for complete search history.

(56) References Cited

U.S. PATENT DOCUMENTS

| 6,834,088 B2 | 12/2004 | Agami et al. | |
| 6,977,972 B1* | 12/2005 | Kandala et al. | 375/332 |
| 7,250,747 B1* | 7/2007 | Ammar | 324/76.14 |
| 2003/0053566 A1 | 3/2003 | He et al. | |
| 2004/0128592 A1* | 7/2004 | Park | 714/709 |
| 2004/0225505 A1* | 11/2004 | Andersen et al. | 704/500 |
| 2004/0225940 A1* | 11/2004 | Kerr et al. | 714/752 |
| 2005/0157822 A1* | 7/2005 | Khandekar et al. | 375/340 |
| 2005/0204272 A1* | 9/2005 | Yamagishi | 714/801 |
| 2005/0286659 A1 | 12/2005 | Abe et al. | |
| 2008/0074307 A1* | 3/2008 | Boric-Lubecke et al. | 342/28 |
| 2009/0019332 A1* | 1/2009 | Hekstra et al. | 714/752 |

FOREIGN PATENT DOCUMENTS

CN         1526215 A       9/2004
(Continued)

OTHER PUBLICATIONS

Chinese Office Action dated Sep. 19, 2010, with English translation.
(Continued)

*Primary Examiner* — Emmanuel Bayard
(74) *Attorney, Agent, or Firm* — McGinn Intellectual Property Law Group, PLLC

(57) ABSTRACT

A log likelihood ratio arithmetic circuit for calculating a log likelihood ratio from information of a coordinate of a reception signal point to be applied to a communication system using a quadrature amplitude modulation method, wherein the circuit limits a scope within which a value of the log likelihood ratio varies corresponding to a position of the reception signal point to a range between adjacent signal points including a hard-decision threshold of a bit, and wherein the value of the log likelihood ratio does not vary outside of the range between the adjacent signal points.

15 Claims, 14 Drawing Sheets

(56) References Cited

FOREIGN PATENT DOCUMENTS

| | | |
|---|---|---|
| EP | 1 246 419 | 10/2002 |
| EP | 1 612 968 | 1/2006 |
| JP | 2002-330188 | 11/2002 |
| JP | 2004-104188 | 4/2004 |
| JP | 2006-50532 | 2/2006 |
| WO | WO 03/007529 A1 | 1/2003 |

OTHER PUBLICATIONS

"AHA Application Note Non-Square QAM Implementation for AHA 4540", AHA Inc.

* cited by examiner

US 8,675,771 B2

LOG LIKELIHOOD RATIO ARITHMETIC CIRCUIT, TRANSMISSION APPARATUS, LOG LIKELIHOOD RATIO ARITHMETIC METHOD, AND PROGRAM

TECHNICAL FIELD

The present invention relates to a log likelihood ratio arithmetic circuit and a log likelihood ratio arithmetic method for calculating and outputting a log likelihood ratio (LLR), and a transmission apparatus including a log likelihood ratio arithmetic circuit.

BACKGROUND ART

In recent years, as demands for higher gain to error-correcting codes to be applied to communication systems have increased, higher-gain codes of a type of performing iterative decoding using soft-decision codes such as turbo (convolution) code, LDPC code, and turbo product code are increasingly used. Further, as the quantity of communications increases regardless of transmission systems such as wireless/wired communication systems or storage systems such as recording mediums, demands for larger-capacity communication systems have also increased.

Input signals of a decoder used for such high-gain codes are signals called LLR. Originally, an LLR of a quadrature modulation (quadrature amplitude modulation: QAM) in which signal point is arranged two-dimensionally is calculated based on a square distance of the reception signal points expressed in two dimensions and all signal points (16 pieces if 16 QAM). Since the square distance calculation is complicated, there has been used a method generally in which a table computed and generated beforehand by a program is stored in a ROM (Read Only Memory) or in a logic circuit (truth table) corresponding to a ROM, and an LLR is calculated with reference to the stored table (see, for example, Non-Patent Document 1).

Further, as an apparatus of calculating an LLR by arithmetic operation, Patent Document 1 discloses an apparatus which calculates a log likelihood ratio of each bit in an M-ary QAM modulated signals to be transmitted in a communication system efficiently in order to reduce the time arithmetic time of LLR.

Patent Document 1: Japanese Patent Laid-Open Publication No. 2002-330188
Non-Patent Document 1: "AHA Application Note Non-Square QAM Implementation for AHA 4540", AHA Inc.

DISCLOSURE OF THE INVENTION

Problems to be Solved by the Invention

In the case of using an LLR calculation method described in Non-Patent Document 1 in a system requiring related LLR, a reference table which has been calculated and created is stored in a circuit such as a ROM beforehand, and a signal including reception signal point coordinates is input to the address of the circuit, whereby an LLR is output.

If the method of referring to the table as described above is applied to a system using a quadrature multilevel modulation (quadrature amplitude modulation: QAM), the number of address bits of a ROM and the number of output bits of a ROM become extremely large, which involves difficulties in mounting due to the circuit size and the delay time.

Specifically, a reception signal coordinate signal of 2ch, in which quadrature modulation is demodulated, is input to an ROM storing the table described above, and the ROM outputs an LLR. In the case of a multilevel modulation method, a reception signal is expressed by using a plurality of bits. In such a case, as LLRs with respect to a plurality of bits allocated to one symbol are required to be output simultaneously, the number of output bits of the ROM is also large.

For instance, in the case of 128 QAM, if one soft-decision part of a quadrature channel has 3 bits, one reception signal point is expressed in (4+3)*2=14 bits, in which 4 bits of the hard-decision part are also included. If an LLR for 1 bit includes 5 bits, the LLRs for 7 bits to be transmitted in one symbol have 35 bits in total. In order to convert the reception signal point of this case into LLRs, a ROM for 14-bit-input and 35-bit-output is required to be prepared, and to realize such a ROM, the circuit size becomes extremely large. Further, as a delay time from an address input to a data output is long, a high-speed operation cannot be performed.

Further, in the apparatus for performing arithmetic operation described in Patent Document 1, the amount of operation is reduced by using symmetrical property in Gray mapping (correspondence between bits and symbol). Therefore, this cannot be applied to a modulation method in which the number of symbols is an odd power of two where the premise conditions of Gray mapping are not satisfied. Further, as the final LLR is calculated by square distance computation, the amount of arithmetic operation to calculate the LLR is still large.

It is an object of the present invention to provide a log likelihood ratio arithmetic circuit, a transmission apparatus, and a log likelihood ratio arithmetic method, capable of calculating a log likelihood ratio at a high speed while reducing the circuit size and the power consumption, regardless of modulation method and bit accuracy of an LLR.

Means for Solving the Problems

A log likelihood ratio arithmetic circuit according to the present invention is a log likelihood ratio arithmetic circuit for calculating a log likelihood ratio from information of the coordinates of a reception signal point to be applied to a communication system using a quadrature amplitude modulation method, characterized in that the scope within which the value of the log likelihood ratio varies corresponding to the position of the reception signal point is limited to a range between adjacent signal points including a hard-decision threshold value of the bits.

A transmission apparatus according to the present invention is a transmission apparatus including a log likelihood ratio arithmetic circuit for calculating a log likelihood ratio from information of the coordinates of a reception signal point to be applied to a communication system using a quadrature amplitude modulation method. The log likelihood ratio arithmetic circuit is characterized in that the scope within which the value of the log likelihood ratio varies corresponding to the position of the reception signal point is limited to a range between adjacent signal points including a hard-decision threshold value of the bits.

A log likelihood ratio arithmetic method according to the present invention is a log likelihood ratio arithmetic method for calculating a log likelihood ratio from information of the coordinates of a reception signal point to be applied to a communication system using a quadrature amplitude modulation method. The method is characterized in that the scope within which the value of the log likelihood ratio varies corresponding to the position of the reception signal point is limited to a range between adjacent signal points including a hard-decision threshold value of the bits.

Effects of the Invention

According to the present invention, in a communication system using a quadrature amplitude modulation method, calculation of a log likelihood ratio, which is originally performed in two dimensions, is dissolved into one dimension, and the amount of arithmetic operation can be reduced significantly. Further, as all or almost all of the operation of log likelihood ratio can be performed by a logical arithmetic unit, there is no need to use a large-scale ROM, and the circuit size and the power consumption can be reduced regardless of the modulation method and the bit accuracy of the log likelihood ratio. Further, as the operating speed of the circuit can be improved, a large-capacity communication system can be realized. Accordingly, it is possible to increase the speed of calculating a log likelihood ratio while reducing the circuit size.

Further, with a configuration to perform quasi-gray encoding using a quadrature amplitude modulation method in which the bit error rate becomes the minimum, it is also possible to perform LLR calculation at a higher speed while reducing the circuit size even in the case of using a quadrature amplitude modulation method having the signal points of an odd power of two.

BEST MODE FOR CARRYING OUT THE INVENTION

An exemplary embodiment of the invention will be described below with reference to the drawings.

In a communication system performing modulation and demodulation, a reception signal point coordinates which is an output of a demodulator are expressed as a combination of orthogonal signals of two channels. In the bits (m+n) of the signal, the upper m bits indicate a hard-decision signal (bits capable of specifying a modulated symbol), and the lower n bits indicate a soft-decision signal (bits indicating intermediate position of the symbol).

As shown in FIGS. 1 and 13, a log likelihood ratio arithmetic circuit according to the exemplary embodiment of the invention includes, as the basic configuration, first arithmetic units (101A, 102A, 103A, 104C, 104D and 210) which are log likelihood ratio arithmetic circuits for calculating a log likelihood ratio of a reception signal expressed in two dimension and is capable of being dissolved into one-dimensional signals, the circuits receiving one one-dimensional signals which is input thereto and performing logical arithmetic operation using information of the signal point coordinates of the one-dimensional signal input, and second computation units (101B, 102B, 103B, 104D, 104E and 201) which receive the other one-dimensional signal input thereto and performs logical arithmetic operation using information of the signal point coordinates of the one-dimensional signal input to thereby calculate a log likelihood ratio.

The first calculation units and the second calculation units limit the scope in which the value of log likelihood ratio varies corresponding to the position of the reception signal point to a range between adjacent signal points including hard-decision threshold of a bit, and calculate the final log likelihood ratio.

According to the exemplary embodiment of the present invention, calculation of a log likelihood ratio performed two-dimensionally is dissolved into one dimension, and the amount of computation can be reduced significantly. Further, as all or almost all calculation of log likelihood ratio can be configured by a logical arithmetic unit, there is no need to use a large-scale ROM, and the circuit size and the power consumption can be reduced, regardless of the modulation method and the bit accuracy of the log likelihood ratio. Further, as the operating speed of the circuit can be improved, a large-capacity communication system can be realized. As such, a log likelihood ratio can be calculated at a higher speed, while reducing the circuit size.

Further, with a configuration to perform quasi-gray encoding such that the bit error rate becomes the minimum, it is possible to make the circuit size smaller and to perform calculation of LLR at a higher speed even in the case of using a quadrature amplitude modulation method having signal points of an odd power of two.

First Exemplary Embodiment

Next, a log likelihood ratio arithmetic circuit which is optimum to a quadrature amplitude modulation method having a signal point of an odd power of two will be described as a first exemplary embodiment. FIG. 1 is a block diagram showing an exemplary configuration of a log likelihood ratio arithmetic circuit (LLR arithmetic circuit) according to the first exemplary embodiment of the invention. In the present embodiment, an LLR arithmetic circuit of 16 QAM will be described as an example. Further, in the exemplary embodiment, it is assumed that the number of hard-decision bits of 16 QAM is 2. Although the number of soft-decision bits varies depending on the required characteristics, the number of soft-decision bits is assumed to be 3 bits in the exemplary embodiment. Further, the LLR arithmetic circuit shown in FIG. 1 is provided to a transmission apparatus of a microwave wireless communication system using QAM (quadrature amplitude modulation method) for example.

As shown in FIG. 1, the LLR arithmetic circuit includes area detection circuits 101A and 101B, LLR circuits 102A and 102B, LLR converters 103A and 103B, and LLR converters 104A and 104B.

Note that if the area detection circuits 101A and 101B are collectively indicated or either of them is indicated, they may be simply indicated as an area detection circuit 101. Similarly, if the LLR circuits 102A and 102B are collectively indicated or either of them is indicated, they may be simply indicated as an LLR circuit 102. Similarly, if the LLR converters 103A and 103B are collectively indicated or either of them is indicated, they may be simply indicated as an LLR converter 103. Similarly, if the LLR converters 104A and 104B are collectively indicated or either of them is indicated, they may be simply indicated as an LLR converter 104.

To the area detection circuit 101A, a hard-decision bit among bits indicating P-axis coordinates of a reception signal point is input, and based on the hard-decision bit input, the area detection circuit 101A detects and outputs an area on the phase plane where the P-axis coordinates of the reception signal point are present.

To the area detection circuit 101B, a hard-decision bit among bits indicating the Q-axis coordinates of the reception signal point is input, and based on the hard-decision bit input, the area detection circuit 101B detects and outputs an area on the phase plane where the Q-axis coordinates of the reception signal point are present.

To the LLR circuit 102A, a soft-decision bit among bits indicating the P-axis coordinates of the reception signal point is input, and based on the soft-decision bit input, the LLR circuit 102A calculates a primary log likelihood ratio (LLR).

To the LLR circuit 102B, a soft-decision bit among bits indicating the Q-axis coordinates of the reception signal point is input, and based on the soft-decision bit input, the LLR circuit 102B calculates a primary log likelihood ratio (LLR).

In the exemplary embodiment, an output signal of the LLR circuit 102 is a primary LLR value only depending on a soft-decision bit. In the exemplary embodiment, a primary LLR value output from the LLR circuit 102 is converted with a hard-decision bit, whereby the final LLR value is calculated.

To the LLR converters 103 and 104, an output signal (primary LLR) of the LLR circuit 102 is input, and based on the output (area detection result) of the area detection circuit 101, the LLR converters 103 and 104 calculate the final LLR.

In the exemplary embodiment, an output signal from the LLR circuit 102 is applied with any one of the four conversions, including (1) directly outputting the output signal from the LLR circuit 102, (2) inverting and outputting the output signal from the LLR circuit 102, (3) replacing the output signal with the predetermined maximum LLR value and outputting it, and (4) replacing the output signal with the predetermined minimum LLR value and outputting it, according to the detection result of the area detection circuit 101. Then, the signal is output as the final LLR value.

FIG. 2 is a block diagram showing an exemplary circuit configuration of the LLR converters 103 and 104. As shown in FIG. 2, each of the LLR converters 103 and 104 include a selection circuit 110 and an inverter 111.

The inverter 111 inverts the bit of the output signal of the LLR circuit 102 and outputs.

To the selection circuit 110, an output signal (primary LLR) from the LLR circuit 102, an output signal from the LLR circuit 102 which is inverted by the inverter 111, the predetermined maximum LLR value, and the predetermined minimum LLR value are input. Further, according to the detection result of the area detection circuit 101, the selection circuit 110 selects any one of the output signal from the LLR circuit 102, the output signal inverted by the inverter 111, the predetermined maximum LLR value, and the predetermined minimum LLR value, and outputs it. Note that the predetermined maximum LLR value and the predetermined minimum LLR value are stored in a storage device such as a memory for example beforehand.

The area detection circuit 101 determines, from the position of the reception signal point, where the reception signal point are present among the four areas including (1) an area in which an LLR varies with a positive inclination crossing the threshold of hard decision, (2) an area in which an LLR varies with a negative inclination crossing the threshold of hard decision, (3) an area in which an LLR does not vary at the maximum value without crossing the threshold of hard decision, and (4) an area in which LLR does not vary at the minimum value without crossing the threshold of hard decision. Then, the area detection circuit 101 outputs a signal corresponding to the determination result.

Note that the processing performed by the area detection circuit 101, the LLR circuit 102, the LLR converters 103 and 104 is completely same in the case of processing bits indicating the P-axis coordinates and in the case of processing bits indicating the Q-axis coordinates.

In the exemplary embodiment, to the LLR arithmetic circuit, a reception signal which is expressed in two dimensions and can be dissolved into one-dimensional signals (P-axis signal and Q-axis signal) is input. In the LLR arithmetic circuit, a one-dimensional signal (P-axis signal) which is derived by dissolving the reception signal is input to the area detection circuit 101A, the LLR circuit 102A and the LLR converters 103A and 104A which configure a first arithmetic unit for calculating a log likelihood ratio (LLR) by carrying out logical arithmetic operation using information of the signal point coordinates of the one-dimensional signal input. Further, the other one-dimensional signal (Q-axis signal) which is a one-dimensional signal derived by dissolving the reception signals is input to the area detection circuit 101B, the LLR circuit 102B, and the LLR converters 103B and 104B which configure a second arithmetic unit for calculates a log likelihood ratio (LLR) by carrying out logical arithmetic operation using information of the signal point coordinates of the input one-dimensional signal. With these configurations, the LLR arithmetic circuit carries out all or almost all of the arithmetic operation for calculating the log likelihood ratio by performing logical arithmetic operation using information of the reception signal point.

Next, operation will be described. Before describing specific operation of the LLR arithmetic circuit, a method of calculating a log likelihood ratio (LLR) will be described first.

An LLR in the multilevel quadrature modulation (QAM) method is calculated for each of the bits allocated to a modulation symbol. For example, in the case of 16 QAM, 16 pieces of modulation symbols are included, and 4 bits are allocated to each symbol. As such, in the case of using 16 QAM, LLRs for 4 bits are to be calculated from one reception signal.

(LLR Definition)

A method of calculating an LLR will be shown below. First, a method of calculating an LLR in the case of BPSK (binary phase shift keying) which is one-dimensional modulation will be described first. If the transmission signal is 2 values of ±1 and this is one-dimensional modulation, LLR(λ) is defined by the following equation (equation (1)):

$$\lambda i = \ln \frac{P(xi = +1 \mid yi)}{P(xi = -1 \mid yi)} \qquad \text{equation (1)}$$

In the equation (1), P(xi=b|yi) is a posterior probability where the transmission signal when the reception signal yi is received is b, and i is a suffix indicating the time.

Further, the posterior probability P(xi=b|yi) with respect to the heat noise in which the amplitude becomes normal distribution is expressed by using the equation (2), where the noise power is δ2.

$$P(xi = b \mid yi) = \frac{1}{\sqrt{2\pi\sigma^2}} \exp\left\{-\frac{(yi-b)^2}{2\sigma^2}\right\} \qquad \text{equation (2)}$$

Therefore, LLR(λ) is calculated by assigning the posterior probability shown in the equation (2) to the equation (1) as shown in the equation (3):

$$\lambda i = \frac{2yi}{\sigma^2} \qquad \text{equation (3)}$$

In the equation (3), assuming that 52 is a constant value and proportional constant is disregarded including 62, LLR(λi) becomes the reception signal (yi) itself. Note that if a min-sum algorism is used as a decoding algorism, setting δ2 to be constant will never affect the decoding characteristics. Further, even in the case of using an algorism other than the min-sum algorism, as the correction ability of the error-correcting code which is the current object is high, only a slight improvement in the signal-to-noise power ratio will make the error rate outside of the measurable range. Consequently, it is reasonable to understand that δ2 is constant.

FIG. 3 shows a positional relationship between the LLR and a reception signal point in the BPSK. It is assumed that the LLR is expressed in a complement number of 2, as a form suitable for operation by the decoder in the later stage of the LLR arithmetic circuit. In this case, as the final output of the demodulator, if the LLR after demodulation is 0 or more, the reception bit is determined as 0, and if the LLR is a negative value, the reception bit is determined as 1. In other words, MSB of the LLR becomes the determination result. Note that handling the LLR as a complement of 2 is not essential. In the case of considering the LLR as an offset binary form, the polarity will be opposite.

Next, a method of calculating the LLR in the case of using a one-dimensional modulation method described above is extended to quadrature modulation (QAM, or two-dimensional modulation method). Even in the case of using multilevel QAM in which a plurality of bits correspond to one symbol, one bit is expressed in two values of ±1. If it is 16 QAM, effects by all 16 pieces of signal points will be calculated for 4 bits by using the equation (2), respectively. Note that yi in the equation (2) is expressed by using quadrature coordinates, and square distance calculation within exp of the equation (2) is performed two-dimensionally.

Although the computation of the LLR described above does not require any restriction for mapping, it is impossible to calculate with a simple form as shown in the equation (3). Therefore, it is extremely difficult to perform the calculation by the arithmetic circuit constructed as hardware. As such, it is necessary to calculate the LLR for all reception signal points using a calculator beforehand, and to save in the ROM in the table form.

Further, as the modulation multilevel number is larger, the number of bits indicating a reception signal point and the number of bits allocated to one symbol become larger. Therefore, in order to output all LLRs for each symbol with the reception signal point coordinates being an input, the size of ROM for storing the LLR becomes extremely large, which cannot be realized practically.

As an example of a circuit using two-dimensional modulation method, a document "Product Specification AHA4541" (hereinafter Document A) describes that AHA4541 which is an LSI for turbo product code made by the US AHA Corp. can support up to 256 QAM. However, Document A fails to disclose an LLR calculation method used for the LSI (AHA4541).

Further, "AHA Application Note Non-Square QAM Implementation for aha4540" (Non-Patent Document 1) which is a document describing the AHA4541 which is an LSI for turbo product code made by the US AHA Corp. discloses, in Section 4.1, a program for calculating an LLR. However, Non-Patent Document 1 nowhere discloses an operating method capable of being performed by hardware and the circuit configuration.

Further, as a method of realizing LLR calculation with a simple operation, there is one which is disclosed in Japanese Patent Laid-Open Publication No. 2002-330188, "Method and Apparatus for Bit Log Likelihood Ratio Operation of QAM Signal" (Patent Document 1).

The art disclosed in Patent Document 1 strictly calculates an LLR based on an LLR definition formula by DSP (digital signal processing LSI), and discloses a method of simplifying the LLR calculation. On the other hand, the method disclosed in Patent Document 1 can significantly reduce the originally required number of operations by gray-coding the map and utilizing the symmetrical property.

However, mapping by gray coding cannot be realized in a modulation method having the number of signal points of an odd power of two like 128 QAM. Regarding this aspect, Patent Document 1 indicates that the application range is limited to the case of using a modulation method which allows gray-coding (Carnot mapping). As such, even in the method of Patent Document 1, an LLR is calculated as a difference of a square distance between the position of a reception signal point and a signal point corresponding to "0" and a signal point corresponding to "1", so the operation is still complicated.

At least, an LLR arithmetic circuit which can be realized on hardware supporting the QAM modulation method, in which the symbol number is the odd power of two, is not present. In addition, an LLR arithmetic circuit not requiring a squire distance calculation in a QAM modulation method of the even power of two, having the same configuration of that of the method of the odd power of two, is not well known.

In contrast, the exemplary embodiment can support the QAM modulation method in which the number of symbols is the odd power of two, and realizes an LLR arithmetic circuit which can achieve a simplified circuit configuration even for the QAM modulation method in which the number of symbols is the even power of two.

(Simplification when the Number of Symbols is Even Power of Two)

Next, simplification of a circuit configuration of an LLR arithmetic circuit when the number of symbols of a reception signal is the even power of two will be described. In order to realize LLR operation in which the number of symbols is the even power of two on a circuit of a practical size, it is necessary to use an arithmetic circuit based not on a table format but on a predetermined rule. Hereinafter, a method of significantly simplifying the LLR operation without deteriorating the accuracy will be described.

First, for simplifying the operation, the following two assumptions are given.

Assumption (a): bit error may be caused, and an area which is the subject of LLR operation is limited to the part between two signal points corresponding to different bits; and Assumption (b): mapping is realized such that even a two-dimensional signal can be independently calculated by each of the one-dimensional signals.

Meaning of these two assumptions and the limitations thereof will be described below.

The assumption (a) means that if the distance between signal points is 2 d, the noise amplitude is 2 d or lower. For example, FIG. 4 shows an example of positional relationship between an LLR and reception signal point in 16 QAM. FIG. 4A indicates an exemplary positional relationship between an LLR and a reception signal point in the case of Pch MSB, and FIG. 4B indicates an exemplary positional relationship between an LLR and a reception signal point in the case of Pch LSB.

As shown in FIG. 4A, in the case of Pch MSB, there are four signal points P0 to P3. As shown in FIG. 4A, in the case of Pch MSB, the bit value changes from 0 to 1 between the signal points P1 to P2. In this case, if a reception signal point is present between P1 and P2, the transmission signal point may be P1 or P2, and as the reception signal point is closer to P1, it is determined that the possibility of the transmission signal point being P1 is high, and that the transmission signal point is never be P0 or P3.

In the example shown in FIG. 4A, a bit error is caused when the noise amplitude exceeds d. If the possibility of causing a bit error is about 0.01 or lower, the possibility that the amplitude of noise according to normal distribution exceeds 2 d is about $1*10^{-6}$. In the case where it is necessary to consider effects of noise having amplitude of 2 d or more, an extremely large number of errors have been caused between noises with amplitude of d to 2 d, and there is no gain in error correction. In that case, no improvement is provided in the error rate by error correcting operation.

Further, even calculation in which effects of all signal points are considered is performed based on the definition of LLR, effects by signal points other than the nearest signal points are extremely small, so that the effects will not be reflected on the LLR value which is quantized to about 3 to 5 bits. Accordingly, the assumption (a) will not deteriorate the accuracy of error correcting operation.

As described above, there is only a part between signals (a part where bit value is changed from 0 to 1 or from 1 to 0 between two signals) corresponding to different bits in which bit error may be caused and information of certainty by the LLR is required. In the outside thereof, it is possible that the value of LLR is fixed to the maximum value or the minimum value. Further, it is only a part between signals crossing a decision threshold of 0 and 1 where it is necessary to change the value of LLR according to the position of reception signal point.

Next, the assumption (b) will be described. Mapping realizing the conditions of assumption (b) is mapping performed by gray-encoding, which is generally adopted for making the bit error rate optimum when the error correction code, which is the subject of the exemplary embodiment, is used. For example, Document A disclosing AHA4541 which is an LSI for turbo product code made by AHA Corp. also describes mapping of gray encoding.

FIG. 5 shows gray encoding mapping of 16 QAM. If the mapping is gray-encoded, the Pch bit is common in the symbols aligned vertically (Q axial direction). Accordingly, it is only necessary to replace the numerator within "exp" of the equation (2) with values of the power of two of the distances (A, B) with the symbols corresponding to the bits 0 and 1 which are closest to the reception signal points. In this case, although there is generally a shift C in the Q axial direction, as the shift C is common to both of the two distances, it is eliminated when being entered into the LLR equation (1). As shown in FIG. 6, assuming that the orthogonal projection of a reception signal point to a horizontal line linking two signal points is a point R and distances to the signal points 0 and 1 are Ap and Bp respectively, the numerator within "exp" in the equation (2) entered into the equation (1) is shown as an equation (4).

$$A2-B2=(Ap2+C2)-(Bp2+C2)=Ap2-Bp2 \quad \text{equation (4)}$$

As shown in the equation (4), an LLR can finally be calculated only from the orthogonal projection (that is, one channel value) of the reception signal point. Of course, this is the same for Qch. In this way, even though the LLR calculation is a two-dimensional modulation method, if it can be dissolved into two independent one-dimensional signals, the modulation method can be considered one-dimensionally. As such, it is understood that an LLR can be easily calculated from the coordinates of the reception signal point.

In the case of multilevel QAM, signal point distributions, in which 0 and 1 are allocated, differ due to bit levels (MSB, 2SB, . . . LSB). Therefore, although it is necessary to change the calculation circuit due to the level of bits for which the LLR is to be calculated, if it is considered within the area where the LLR value varies, the level of the bit has no relation. As such, the circuit of the part where the LLR varies corresponding to the coordinates of the reception signal point is common. In other words, it is only necessary to change the output of the common LLR calculation circuit according to the level of the bit.

As described above, the two assumptions (a) and (b) provide an effect of significantly simplifying the calculation procedures of LLR, without inversely affecting the arithmetic accuracy of the LLR and freedom in realizing apparatuses substantially. Further, as there is no need to consider effects of a signal point which is not the subject, the relative positional relationship between the reception signal point and the signal point and the relation with LLR values do not depend on bit levels (MSB, 2SB, . . . LSB).

FIG. 4 shows a state of LLR values in Pch of 16 QAM. In MSB, there is an inclination in one place (between P1 and P2). Further, in LSB, there are two inclinations (between P0 and P1, and between P2 and P3), and their polarities are opposite. The levels of inclinations are same in MSB and LSB. This is also the case of Qch.

In FIG. 4, an LLR corresponding to the bit "0" is set to be a maximum value, and an LLR corresponding to the bit "1" is set to be a minimum value. This is because when the part of the soft-decision bit indicating the position of the reception signal point is seen as an expression of the complement of 2, the MSB coincides with the hard-decision value of the bit. Further, the reason of seeing as the expression of the complement of 2 is because it is convenient when performing numeral value operation based on the LLR by a decoder, so it is not essential. Further, the polarity of the LLR can be set while considering consistency with the surrounding circuit.

As LLR values in the area where the LLR changes corresponding to the position of the reception signal point become the same regardless of the values of the hard-decision bits, the LLR can be calculated while only referring to the soft-decision bit. Therefore, even if the number of soft-decision bits is 5 for example, there are 32 ways of LLRs at most. Even if this part is created using an ROM, the circuit size can be extremely small. Further, if it is acceptable that the position between signal points and the LLR are in proportional relationship, the soft-decision signal of the reception signal can be the LLR directly, so an LLR calculation circuit is not required. That is, the LLR circuit 102 shown in FIG. 1 can be created by only using the connection. In general, sufficient characteristics can be obtained by this method. If it is desired to change the gain of the LLR, it is only necessary to change the inclination of the LLR by using a multiplexer inside the decoder which actually operates the LLR, or the like.

To fix the value of the LLR according to the position of the reception signal point and to invert the LLR, an output signal of the LLR calculation circuit 102, it is only necessary to input a signal generated by inverting the output signal, and input fixed values (minimum value and maximum value), to the selection circuit 110. Then, according to the output of the area detection circuit, the selection circuit 110 selects and outputs any one of the inputs.

Further, as Pch and Qch are same in the mapping of gray encoding, the same two circuits can be applied to Pch and Qch channels, respectively.

In view of the above, the LLR arithmetic circuit of 16 QAM can be configured as shown in FIGS. 1 and 2.

Next, specific operation of the LLR arithmetic circuit will be described. FIG. 7 is a flowchart showing an exemplary process of calculating an LLR by the LLR arithmetic circuit. Although the case of calculating an LLR on the Pch side will be described below, the case of calculating an LLR on the Qch side is also the same. This means, in the below description, calculating an LLR on the Qch side can be described by replacing the area detection circuit 101A with the area detection circuit 101B, replacing the LLR circuit 102A with the LLR circuit 102B, replacing the LLR converters 103A and 104A with the LLR converters 103B and 104B, and replacing the P axis with the Q axis.

In the process of calculating an LLR, first, to the area detection circuit 101A of the LLR arithmetic circuit, a hard-decision bit among bits indicating P-axis coordinates of the reception signal point is input. Then, based on the hard-decision bit input, the area detection circuit 101A detects an area on the phase plane where the P-axis coordinates of the reception signal point are present (step S11). Then, the area detection circuit 101A outputs the detection result of the area on the phase plane to the LLR converters 103A and 104A.

In the step S11, the area detection circuit 101A specifically detects that whether the area on the phase plane where P-axis coordinates of the reception signal point are present is (1) an area in which an LLR changes with a positive inclination crossing the hard-decision threshold, (2) an area where an LLR changes with a negative inclination crossing the hard-decision threshold, (3) an area where an LLR does not cross the hard-decision threshold and does not change at the maximum value, or (4) an area where an LLR does not cross the hard-decision threshold and does not change at the minimum value, and then the area detection circuit 101A outputs the result.

Further, to the LLR circuit 102A, a soft-decision bit among the bits indicating P-axis coordinates of the reception signal point is input. Then, based on the soft-decision bit input, the LLR circuit 102A calculates the primary LLR (step S12). Then, the LLR circuit 102A outputs the calculated primary LLR to the LLR converters 103A and 104A.

To the selection circuits 110 of the LLR converters 103A and 104A, the output signal (primary LLR) of the LLR circuit 102A, the output signal of the LLR circuit 102A which is inverted by the inverter 111, the predetermined LLR maximum value, and the predetermined LLR minimum value are input. Then, based on the detection result of the area detection circuit 101A, the selection circuit 110 selects one of the output signal of the LLR circuit 102A, the output signal inverted by the inverter 111, the predetermined LLR maximum value, and the predetermined LLR minimum value (step S13). Then, the selection circuit 110 outputs the selection result of the step S13 as the final LLR (step S14).

Specifically, if the detection result of the area detection circuit 101A is the above item (1), that is, an area in which the LLR changes with positive inclination crossing the hard-decision threshold, the selection circuit 110 directly selects and outputs the output signal of the LLR circuit 102. If the detection result of the area detection circuit 101A is the above item (2), that is, an area in which the LLR changes with a negative inclination crossing the hard-decision threshold, the selection circuit 110 selects and outputs the output signal of the LLR circuit 102A which is inverted by the inverter 111. If the detection result of the area detection circuit 101A is the above item (3), that is, an area in which the LLR does not cross the hard-decision threshold and does not change at the maximum value, the selection circuit 110 selects and outputs the predetermined LLR maximum value. If the detection result of the area detection circuit 101A is the above item (4), that is, an area in which the LLR does not cross the hard-decision threshold and does not change at the minimum value, the selection circuit 110 selects and outputs the predetermined LLR minimum value.

Through the process described above, the selection circuit 110 calculates the soft-decision signal shown one-dimensionally between the adjacent signal points over the two (0, 1) decision thresholds as a log likelihood ratio directly. Further, the selection circuit 110 calculates the soft-decision signal shown one-dimensionally between the adjacent signal points not crossing the two (0, 1) decision threshold as a log likelihood ratio while fixing to the predetermined maximum value or to the predetermined minimum value, according to the position of the signal point on the phase plane.

Next, the differences between the apparatus described in Patent Document 1 and the LLR arithmetic circuit shown in the exemplary embodiment will be described. In Patent Document, LLR calculation is performed by using only the above-described assumption (b). Although it is common to the exemplary embodiment in using a concept that the gray-encoded mapping can be considered one-dimensionally, as the assumption (a) is not taken into account, the apparatus in Patent Document 1 calculates the LLR using the equation (4). Therefore, the amount of operation for calculating the LLR cannot be reduced sufficiently. In the exemplary embodiment, the amount of operation is reduced more than that of the apparatus described in Patent Document 1 without deteriorating the characteristics substantially, due to the effect of the assumption (a).

The arithmetic method given above will be described below by exemplary using the case of 16 QAM. It is assumed that the coordinates of the reception signal are expressed as natural codes in which the hard-decision bit and the lower soft-decision bit are combined (in Pch, the left ends are all "0" and the right ends are all "1").

First, an LLR with respect to the hard-decision MSB of Pch will be described. MSB of Pch is formed such that 8 pieces in the right half of the signal point are 1, and 8 pieces in the left half are 0 (refer to FIG. 5) Therefore, the part which forms a decision threshold of the values of MSB of Pch is the Q axis.

If the reception signal point is present in the left from the signal point line on the immediately left side of the Q axis, there is no possibility that the transmission signal is "1", so the LLR is the maximum value. In contrast, if the reception signal point is present in the right from the signal point line on the immediately right side of the Q axis, there is no possibility that the transmission signal is "0", so the LLR is the minimum value. As an error may be caused in Pch MSB only when the reception signal point is in between signal points over the Q axis, the LLR value corresponding to the position of the reception signal point is needed. As the probability is low (probabilities of 0 and 1 are near) when the reception signal point is near the Q axis, the absolute value of LLR becomes smaller. As the reception signal point is away from the Q axis, the probability that the transmission signal is "0" or "1" becomes higher, so the absolute value of LLR becomes larger.

If the soft-decision bit is the LLR, it is the complement of 2, and it is a negative value when it is larger than the threshold, while it is a positive value when it is smaller than the threshold. This MSB coincides with the hard-decision value of the bit. FIG. 6 shows the case where the soft-decision bits are 3 bits.

FIG. 8 illustrates an example showing LLR area sections with respect to the MSB of Pch. As shown in FIG. 8, there are three areas in the LLR area sections to the MSB of Pch, including, from the left side, an area 501 where the LLR is the maximum value, an area 502 where the LLR changes from positive and negative, and an area 503 where the LLR is the minimum value.

Further, the LLR with respect to the MSB of Qch is also determined in the same manner as that of MSB of Pch.

Next, an LLR with respect to 2SB ($2^{nd}$ Significant Bit, in this case, also LSB) of Pch will be described. The 2SB of Pch includes 0, 1, 1, and 0 from the signal point line on the left, and there are two parts forming decision thresholds. At these two positions (between signal points), the LLR changes as the case of MSB. In this case, although the bits are in the order of 0 and 1 at the thresholds positions on the left, which is the same as that of MSB, the bits are in the order of 1 and 0 at the thresholds positions on the right, which is in the opposite order to that of MSB. Therefore, it is necessary to change the polarity of the LLR at the two thresholds positions.

Since no error will be caused between signal points where both of the bits are 1, the LLR is set to be the minimum value (negative maximum absolute value). Further, since no error will be caused on the outside from the two lines on the both sides on the phase plane, the LLR is set to be the maximum value (positive maximum absolute value) (refer to FIG. 4B).

FIG. 9 illustrates an example showing LLR area sections with respect to the 2SB (LSB) of Pch. As shown in FIG. 9, the LLR area sections with respect to 2SB (LSB) of Pch have five areas, including, from the left, an area 551 where the LLR is the maximum value, an area 552 where the LLR is changed from positive to negative, an area 553 where the LLR is the minimum value, an area 554 where the LLR is changed from negative to positive, and an area 555 where the LLR is the maximum value.

The LLR with respect to 2SB of Qch is set in the same manner as that of 2SB of Pch.

Further, in the case of applying to a modulation method in which multilevel signal points are the even power of two (e.g., 64 QAM, 256 QAM, etc), it is only necessary to add 3SB or after in the similar manner.

In the circuit configuration of the LLR arithmetic circuit shown in the exemplary embodiment, the circuit size will not be changed significantly even if the modulation multilevel number increases. Therefore, as the multilevel number is larger, the reduction rate of the circuit size becomes larger compared with the circuit configuration for realizing a circuit for LLR operation using a ROM. As such, an LLR arithmetic circuit can be realized without a need of a large-scale ROM, regardless of the modulation method. Accordingly, it is easy to realize high-speed operation, compared with the related circuit configuration for LLR arithmetical operation.

As described above, according to the exemplary embodiment, it is possible to dissolve the LLR calculation which is originally performed two-dimensionally into one-dimensionally and to significantly reduce the amount of operation, in the communication system using QAM. Further, as all or the almost all of the LLR arithmetic operation can be performed by a logical arithmetic unit, there is no need to used a large-scale ROM, and the circuit size and the power consumption can be reduced regardless of the modulation method and the bit accuracy of LLR. Further, the operating speed of the circuit can be improved, and consequently, a large-capacity communication system can be realized. Accordingly, it is possible to realize higher-speed LLR calculation while reducing the circuit size.

Although the elements (101A, 101B, 102A, 102B, 103A, 103B, 104A, 104B) configuring the LLR arithmetic circuit shown in FIGS. 1 and 2 are constructed as hardware, it is also acceptable to construct the functions performed by those elements as programs which are software, and to cause a computer to perform those programs to thereby carry out the processes performed by the LLR arithmetic circuit.

Second Exemplary Embodiment

Next, a second exemplary embodiment of the present invention will be described with reference to the drawings. Although the first exemplary embodiment has described the case where the number of symbols is the even power of two, the exemplary embodiment describes the case where the number of symbols is the odd power of two. Before the specific configuration and operation of the LLR arithmetic circuit is described, a method of calculating an LLR when the number of symbols is the odd power of two will be described first. Gray-encoded mapping can be realized only when the case of using a quadrature modulation method in which the number of signal points is even power of two. In the case of using a modulation method in which the number of signal points is the odd power of two (e.g., 32 QAM, 128 QAM), gray encoding cannot be realized.

However, it is possible to create a map in which parts where a bit difference (humming distance) between adjacent signal points is 2 or more is made as few as possible by using the concept of gray-encoding. Hereinafter, this is called quasi-gray encoding in the exemplary embodiment.

FIG. 10 is a map showing quasi-gray encoding in the case of using 32 QAM. In the quasi-gray encoding, MSB (highest bit) of the orthogonal two channels is gray-encoded. Further, LSB (lowest bit) may also be gray-encoded depending on the multilevel number. Accordingly, these bits can be considered by dissolving into one dimension in the same manner as that of the modulation method where the number of signal points is the even power of two.

Although the bits which are not gray-encoded are arranged two-dimensionally, when the mapping is determined using the concept of gray encoding, the number of threshold values of 0, 1 decision can be reduced by treating them as the same group of bit. FIG. 10 shows an exemplary map of 32 QAM calculated based on that concept. In FIG. 10, each of the numbers surrounded by a square is MSB. Further, those positioned near the symbol are 3 bits other than MSB.

FIG. 11 illustrates an example of LLR area for 3SB (left end of 3 bits) of 32 QAM. As shown in FIG. 11, 3SB of 32 QAM is not divided in one direction which is different from the case of each area being gray-encoded, but is divided in two directions of P axis and Q axis. In FIG. 11, regarding a part 605 where the areas divided in two directions overlap, it is necessary to calculate the LLR while considering information of the two directions. Hereinafter, such areas are called special areas. As shown in FIG. 11, in 3SB of 32 QAM, four special areas are present on the phase plane, each of which is placed in each quadrant. There are some types of special areas depending on the relationship with signal points or bits, and the way of processing LLR calculation differs corresponding to the type of the special area.

FIG. 12 illustrates examples of special areas. In FIG. 12, two types of special areas are exemplary shown. FIG. 12A shows the case where signal points are present in four quadrants of the special area, and three bits among the four bits of the signal point are the same. As the special area is divided into four areas by a bit which is one-level lower than the hard-decision bit, the numbers same as those of the quadrants of the orthogonal coordinates are allocated to the four areas (see FIG. 12C).

First, the case where the reception signal point is present in the quadrant 1 will be considered. In the quadrant 1 and the quadrant 2, the bits are 1, that is, the same, and no error will be caused. However, as the bits are different in the quadrant 1 and the quadrant 4, that is, 1 and 0, an error may be caused, and the soft-decision value in Q-axial direction becomes the LLR. In the case where the reception signal point is present in the quadrant 2, as the bit is the same as those of the quadrant 1 and the quadrant 3, that is, 1, no error will be caused, so the LLR is the minimum value. In the case where the reception signal point is present in the quadrant 3, the bit is different from that of the quadrant 4, that is, 1 and 0, so the soft-decision value in the P-axial direction becomes the LLR.

Further, in the case where the reception signal point is present in quadrant 4, as the bits are 1 and 0 with the quadrants 1 and 3, two LLRs will be obtained from the soft-decision values in the P-axial direction and the Q-axial directions. Then, one having the smaller absolute value (having higher possibility of error) of the two LLRs is selected as the LLR.

FIG. 12B shows the case where signal points are present at only three corners of the special area. The way of dividing the special area is the same as that shown in FIG. 12A. As two directions can be considered when the reception signal point is present in the quadrant 1 and when the signal point is present in the quadrant 3, one having the smaller absolute value of the two LLRs is selected. Further, as there is no effect from absent signal points, when the reception signal point is present in the quadrant 2 and when the reception signal point is present in the quadrant 4, the LLR is obtained for one direction where the signal point is present.

In summary, even in any special area, it is possible to define signal processing in the four or three quadrants within the area according to the rules described below.
(Rule 1): If bits in two directions (P-axial direction and Q-axial direction) are the same, the LLR is the maximum value or the minimum value.
(Rule 2): If a bit in only one direction (P-axial direction or Q-axial direction) is different, the LLR in a direction where the bit is different is selected.
(Rule 3): If both bits in two directions (P-axial direction and Q-axial direction) are different, one having a smaller absolute value of the two LLRs is selected as the LLR.
(Rule 4): For a direction with no signal point, no bit error will be caused.
(Rule 5): If the reception signal point is present in an area with no signal point, an LLR having a smaller absolute value, among LLRs in P-axial direction and Q-axial direction, is selected.

For 4SB and 5SB (LSB), an LLR in a special area can be obtained by applying the same concept although the sections of areas are different. As such, LLRs of all bits can be calculated by the arithmetic circuit, together with MSB (of two channels) in which gray encoding is possible.

As described above, as a special area is present in the case of 32 QAM so that it is necessary to perform area decision using a lower bit of the hard-decision bit, the LLR arithmetic circuit in the case of using 32 QAM can be configured as shown in FIGS. 13 and 14.

FIG. 13 is a block diagram showing another exemplary configuration of an LLR arithmetic circuit, and FIG. 14 is a block diagram showing another exemplary configuration of the LLR converters 104C, 104D and 104E. As shown in FIG. 14, in the exemplary embodiment, an LLR arithmetic circuit includes, a processing circuit for a normal area which calculates LLRs for a normal area including only bits which are completely gray-encoded among the quasi-gray encoded bits output from an encoder, and a processing circuit for a special area which calculates LLRs for a special area including bits which are not completely gray-encoded among the quasi-gray encoded bits output from an encoder.

Hereinafter, operation of the LLR arithmetic circuit shown in FIGS. 13 and 14 will be described. First, as it is expressed by gray codes in MSB (P/Q 2 bits), operation of the LLR arithmetic circuit is the same as that of 16 QAM.

Next, in the case of 3-5SB (3 bits), when processing of a normal area is to be performed, the LLR arithmetic circuit may (1) output the maximum value (fixed value) of the LLR, (2) output the minimum value (fixed value) of the LLR, (3) directly output the LLR if the inclination of the LLR is positive, or (4) generate and output a signal in which all bits of the LLR are inverted if the inclination of the LLR is negative. In this case, the LLR includes P direction and Q direction. Based on the area decision result (2 bits) of the area detection circuit 201, the LLR arithmetic circuit selects an output of any one of the items (1) to (4) above.

In this case, an area decision result (REG_N) indicates precision of specifying one area surrounded by four adjacent signal points. Further, an LLR is information indicating only the soft-decision part among bits indicating the reception signal point.

In the case of performing a process of a special area, the LLR arithmetic circuit may (1) output the maximum value (may be positive or negative, the polarity is determined by the bit string (3-5SB)) of the absolute value, (2) always output an LLR in P direction, (3) always output an LLR in Q direction, or (4) output an LLR having the smaller absolute value (min (|P|, |Q|) of LLRs in P direction and Q direction, using an LLR absolute value comparator. In this case, the LLR arithmetic circuit selects any one of the above items (1) to (4) based on the quadrant decision result (REG_S) inside the special area by the area detection circuit 201. Note that the selected signals are 4 bits as there are four quadrants in each of the four special areas. Further, the polarity may be opposite in the outputs (2) to (4).

As special areas are different in the respective bit strings 3-5SB, an output of area decision with respect to the same reception signal point is different for each bit string. Further, the LLR arithmetic circuit selects and outputs any one of the two results (output of a processing circuit in the normal area and output of a processing circuit in the special area) depending on the separating signal of the normal area and the special area. In this case, for an output not selected by the LLR arithmetic circuit, any signal may be output.

The area decision circuit (area detection circuit 201) includes two types of circuits, that is, DET 1 for bit strings in a Gray Mapping, and DET 2 for bit strings which are not in a Gray Mapping. Further, the DET 2 outputs three type of signals, including REG_N for the normal area, REG_S for the special area, and REG_N for separating the normal area and the special area.

Note that the circuit design shown in the exemplary embodiment is an example, and in the actual circuit design, there are a plurality of ways of realizing LLR arithmetic circuits other than the LLR arithmetic circuit shown in the exemplary embodiment. In the exemplary embodiment, the normal area and the special area are described while being separated such that the necessary signal processing is easily understood.

In the case of applying to a modulation method in which the multilevel signal points are the odd power of two (e.g., 128 QAM, 512 QAM), it is only necessary to set an LLR area of bit strings which cannot be gray-encoded in the same way of thinking as described above. In a modulation method for 128 QAM or more (e.g., 512 QAM), LSB (2 bits) can also be gray-encoded, which can be realized with a circuit simpler than that of 32 QAM.

In the circuit configuration of the LLR arithmetic circuit shown in the exemplary embodiment, the circuit size will not change significantly even if the modulation multilevel number becomes larger. Therefore, as the multilevel number is larger, the circuit size reduction rate becomes larger compared with the circuit configuration in the case of realizing a circuit for LLR operation using a ROM. Therefore, it is possible to realize an LLR arithmetic circuit without a need of a large-scale ROM, regardless of the modulation method. As such, higher-speed operation can be realized easily compared with a related circuit configuration for LLR operation.

Although the elements (102A, 102B, 201, 103A, 103B, 104C, 104D, 104E, 112, 113 and 114) configuring the LLR arithmetic circuit shown in FIGS. 13 and 14 are constructed as hardware, the functions performed by these elements may be constructed as programs which are software to be executed by a computer such that processing performed by the LLR arithmetic circuit is carried out.

As described above, according to the exemplary embodiment, even if QAM having a signal point of the odd power of two is used, it is possible to perform LLR calculation at a higher speed while reducing the circuit size by performing quasi-gray encoding.

Note that the LLR arithmetic circuit shown in each of the exemplary embodiments can be applied to error correction codes for iterative decoding of a soft-decision signal and a decoder therefor. Examples of those codes which have been known include turbo (convolution) code, TPC (turbo product code), and LDPC (Low-Density Parity-Check).

Further, with a used of the LLR arithmetic circuit shown in each of the exemplary embodiments, an LLR can be used as a metric of an input of an equalizer. As such, the LLR arithmetic circuit shown in each of the exemplary embodiments can be used as an LLR arithmetic circuit of an input signal of an equalizer by maximum likelihood sequence estimation, besides an error correction code decoder.

Further, in each of the exemplary embodiments, the LLR arithmetic circuit may include an ROM to which a soft-decision signal shown one-dimensionally between adjacent signal points having two (0, 1) decision thresholds between them is input and which outputs a log likelihood ratio calculated beforehand, or a log likelihood ratio output circuit including a logic circuit corresponding thereto. Further, it is also acceptable that a log likelihood ratio output circuit is shared by all reception signal points, and according to the position on the phase plane of the reception signal points, an output of the LLR may be output by being replaced with a fixed value.

Next, another exemplary embodiment of the invention will be described.

A log likelihood ratio arithmetic circuit may set the correspondence relationship between bit and symbol such that the bit error rate becomes the minimum. Further, a log likelihood ratio arithmetic circuit may set the correspondence relationship between bit and symbol, when the modulation method has signal points of the even power of two, to be in a Gray mapping. Further, a log likelihood ratio arithmetic circuit may set the correspondence relationship between bit and symbol, when the modulation method has signal points of the odd power of two, to be in a quasi-Gray mapping where the bit error rate becomes the minimum. Further, it is also acceptable that a log likelihood ratio arithmetic circuit may perform all or almost all operation for calculating a log likelihood ratio by logic operation using information of reception signal point coordinates.

Further, a log likelihood ratio arithmetic circuit may output the part of soft-decision bits of 1CH among information of reception signal point coordinates indicated in 2CH directly or by inverting them, as a log likelihood ratio of an area where the log likelihood ratio varies. Further, a log likelihood ratio arithmetic circuit may output the maximum value or the minimum value of the log likelihood ratio as the log likelihood ratio of an area where the log likelihood ratio does not vary. Further, if there is an area which cannot be determined based on only information of hard-decision bit of 1CH among information of reception signal point coordinates shown in 2CH, it is also acceptable that for an area where a bit error will never be caused under the conditions described in Claim 1, a log likelihood ratio arithmetic circuit outputs the maximum value or the minimum value of the log likelihood ratio, and for an area where a bit error may be caused, the log likelihood ratio arithmetic circuit outputs a soft-decision bit of lower likelihood of 2CH.

Further, in a log likelihood ratio arithmetic circuit, selection of a log likelihood ratio may be performed by using a result of area decision based on information of hard-decision bit in 1CH of information of reception signal coordinates indicated in 2CH. Further, in a log likelihood ratio arithmetic circuit, selection of a log likelihood ratio may be performed by using a result of area decision by referring to bits one level lower than the hard decision, if there is an area where area decision cannot be performed only based on information of hard-decision bit in 1CH of information of reception signal point coordinates indicated in 2CH. Further, in a log likelihood ratio arithmetic circuit, a log likelihood ratio may be one which is converted from a soft-decision bit to another value.

The log likelihood ratio (LLR) arithmetic circuit according to the exemplary embodiment does not refer to a predetermined table but directly calculates an LLR from reception signal point coordinates through arithmetic operation using actual time. With such a configuration, compared with the case of configuring a circuit using a ROM, the circuit size can be extremely small, and also high-speed operation can be realized. Further, the log likelihood ratio arithmetic circuit according to the present invention dissolves reception signal point coordinates in two dimensions into two one-dimensional signals, and performs LLR operation for each bit allocated to a symbol. As such, a log likelihood ratio arithmetic circuit can also be realized using a small circuit with a little delay such as a selection circuit, a large and small comparator or an inverter. Accordingly, the circuit configuration is simplified by dissolving the coordinates of a reception signal point which is in two dimensions originally into two one-dimensional signals. Further, a modulation method applicable to the log likelihood ratio arithmetic circuit according to the exemplary embodiment has no restricting conditions in the number of symbols. Further, as the LLR itself is simplified in the scope of not affecting the error correction decoding characteristics, no square distance operation is required.

Although the present invention has been described by referring to the exemplary embodiments, the present invention is not limited to the above-described exemplary embodiments. The configuration and the details of the present invention can be modified within the scope of the present invention in various ways which can be understood by those skilled in the art.

The present application claims priority based on Japanese Patent Application No. 2006-266523 filed on Sep. 29, 2006, the entire disclosure of which is incorporated herein.

INDUSTRIAL APPLICABILITY

The present invention is applied to communication systems using quadrature multilevel modulation method (quadrature amplitude modulation method), and is applicable to an LLR calculation circuit which calculates a log likelihood ratio serving as an input signal of an error correction decoder and an equalizer.

Figure 1:
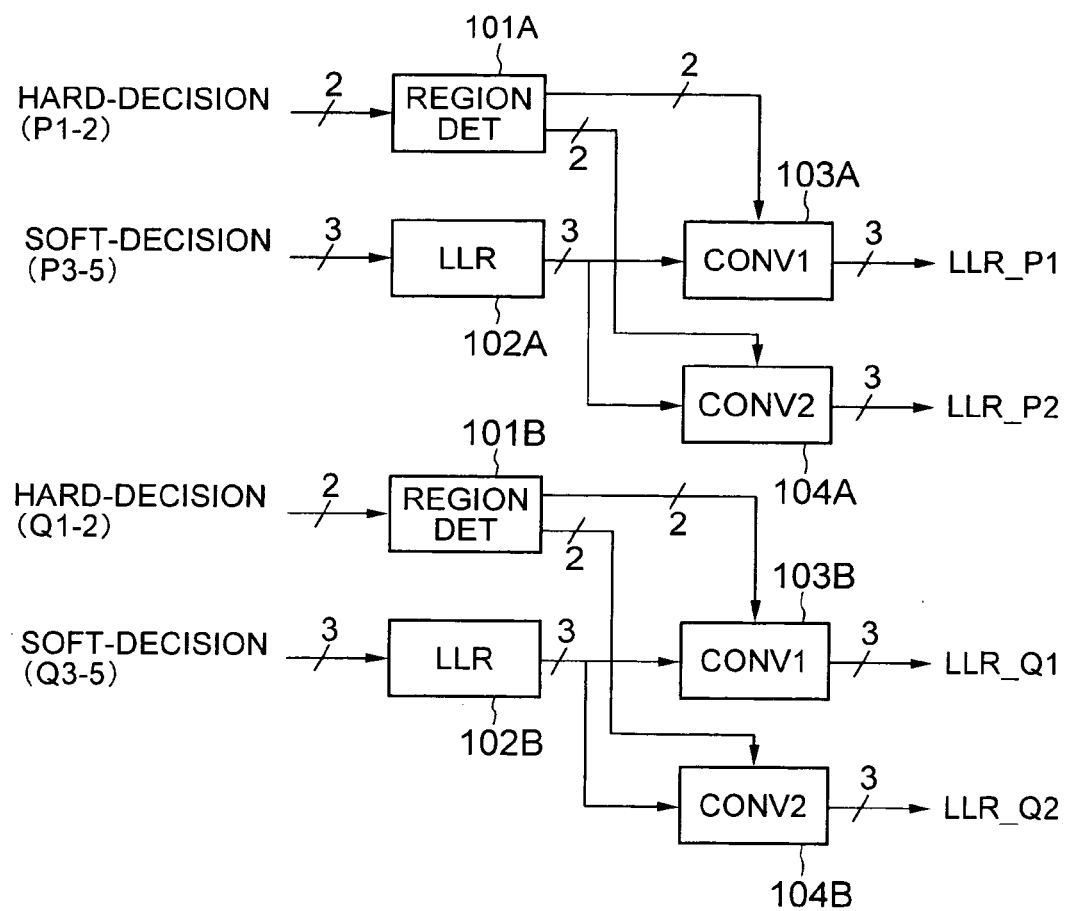
FIG. 1 is a block diagram showing an exemplary configuration of a log likelihood ratio arithmetic circuit (LLR arithmetic circuit) according to the present invention.
Figure 2:
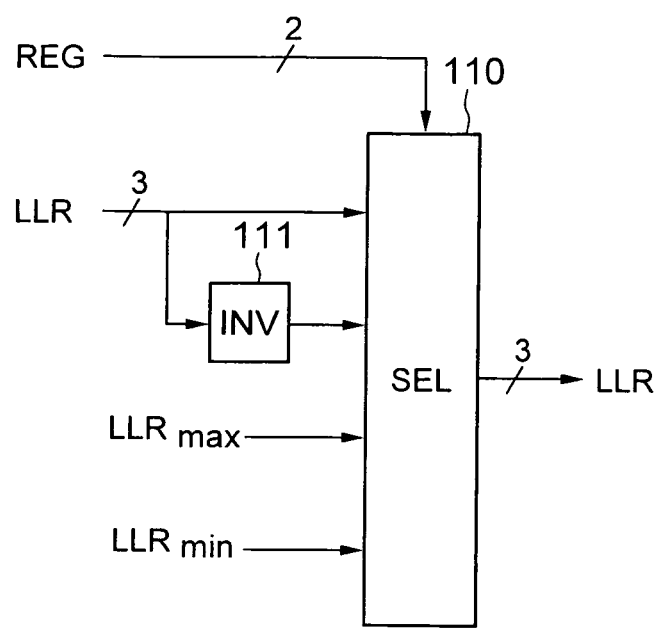
FIG. 2 is a block diagram showing an exemplary circuit configuration of an LLR converter.
Figure 3:
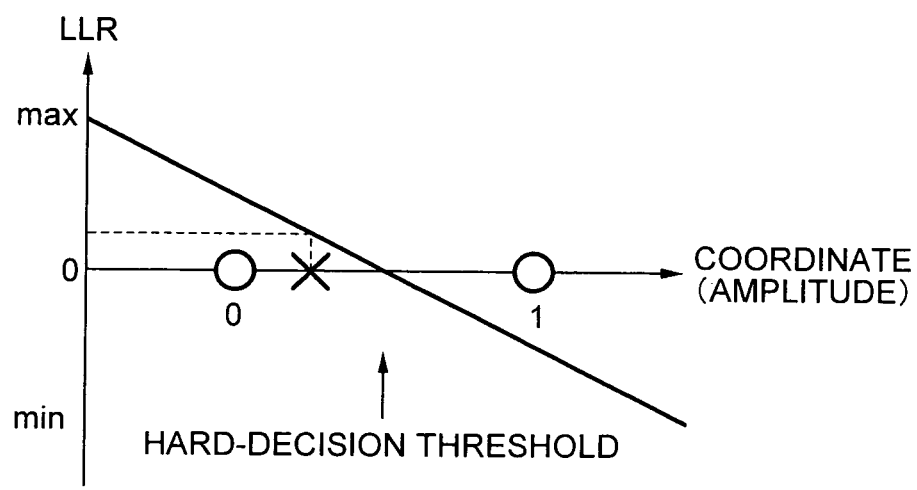
FIG. 3 is an illustration showing a positional relationship between an LLR and a reception signal point in BPSK.
Figure 4A:
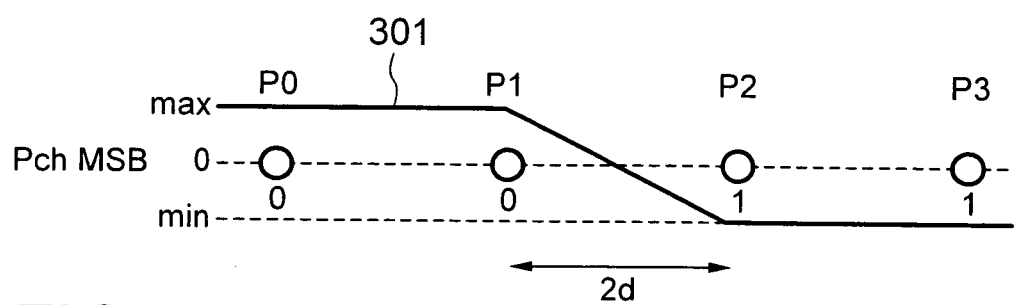
FIG. 4 is an illustration showing an example of a positional relationship between an LLR and a reception signal point in 16 QAM.
Figure 4B:
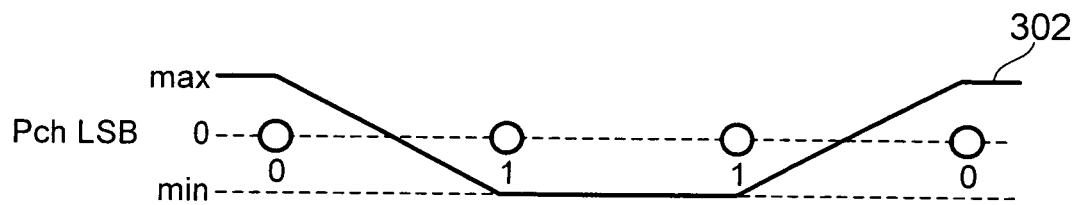
Figure 5:
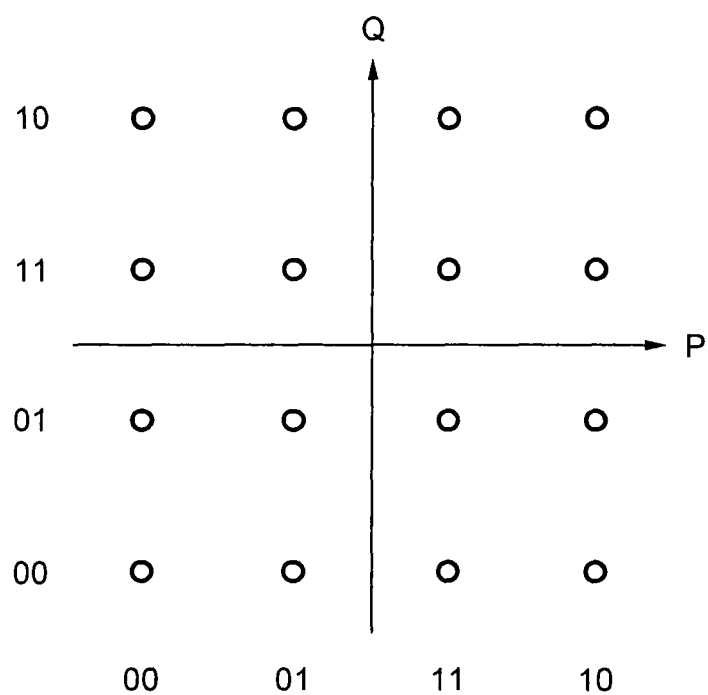
FIG. 5 is an illustration showing gray-encoding mapping (mapping of hard-decision bits) of 16 QAM.
Figure 6:
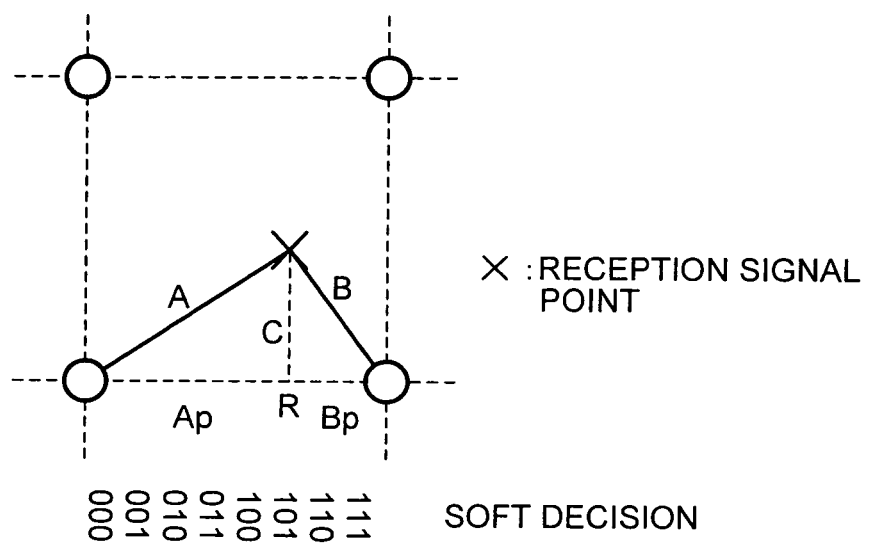
FIG. 6 is an illustration showing an example in which the soft-decision bits are 3 bits.
Figure 7:
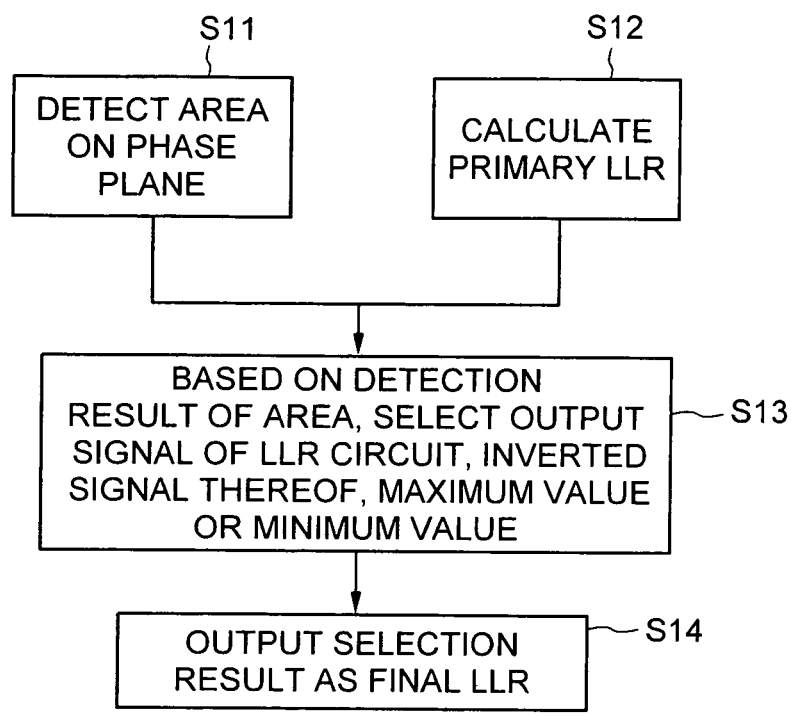
FIG. 7 is a flowchart showing exemplary processing in which an LLR arithmetic circuit calculates an LLR.
Figure 8:
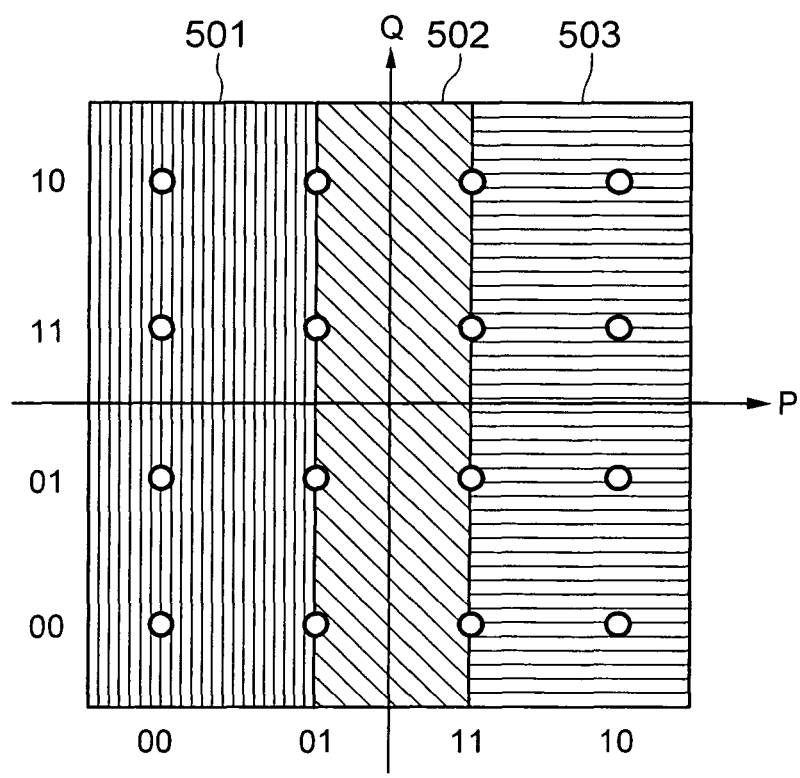
FIG. 8 is an illustration showing an example of LLR area sections with respect to MSB of Pch.
Figure 9:
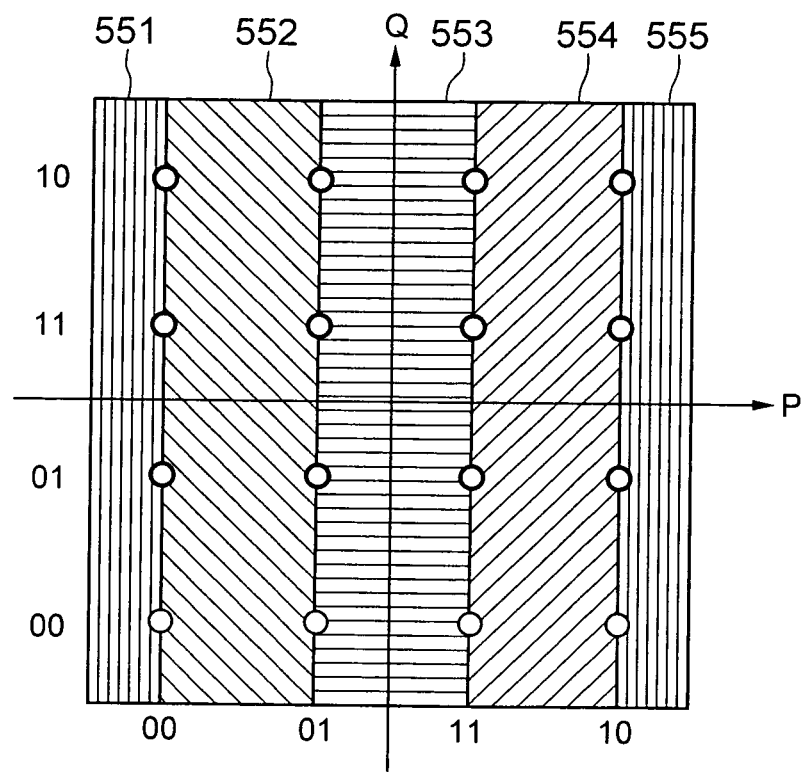
FIG. 9 is an illustration showing an example of LLR area sections with respect to 2SB (LSB) of Pch.
Figure 10:
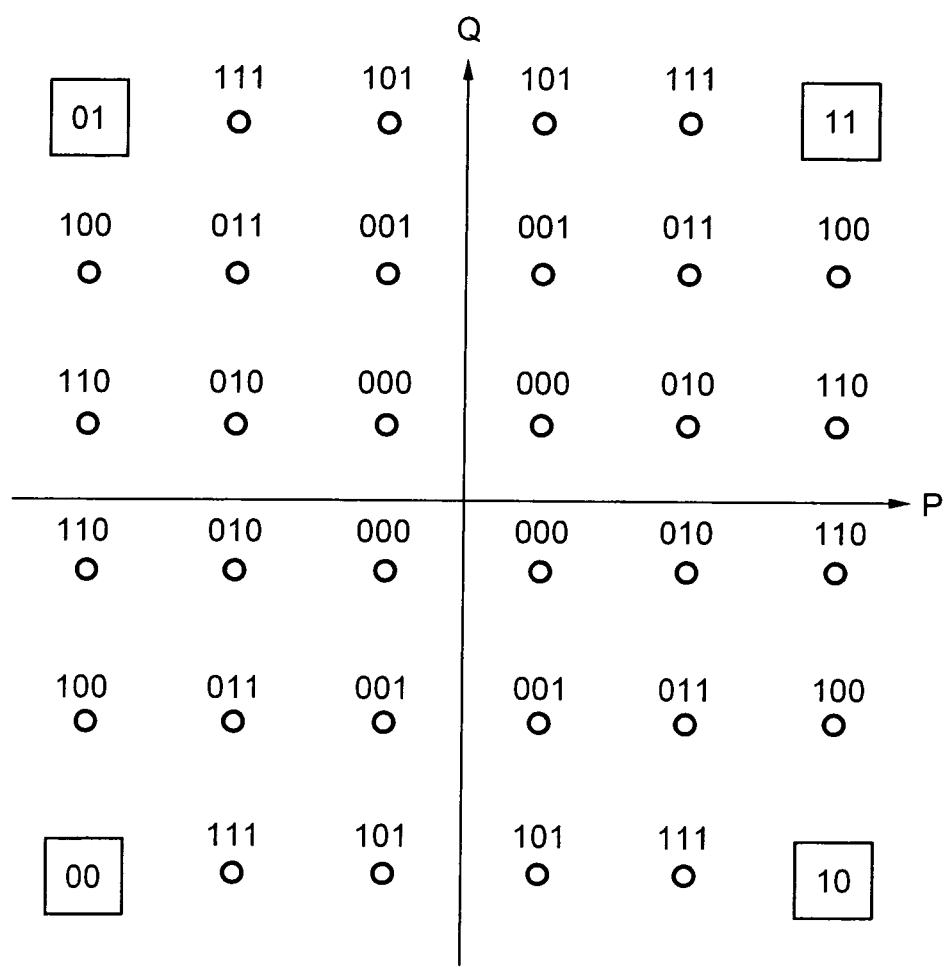
FIG. 10 is an illustration showing mapping of quasi-gray encoding when 32 QAM is used.
Figure 11:
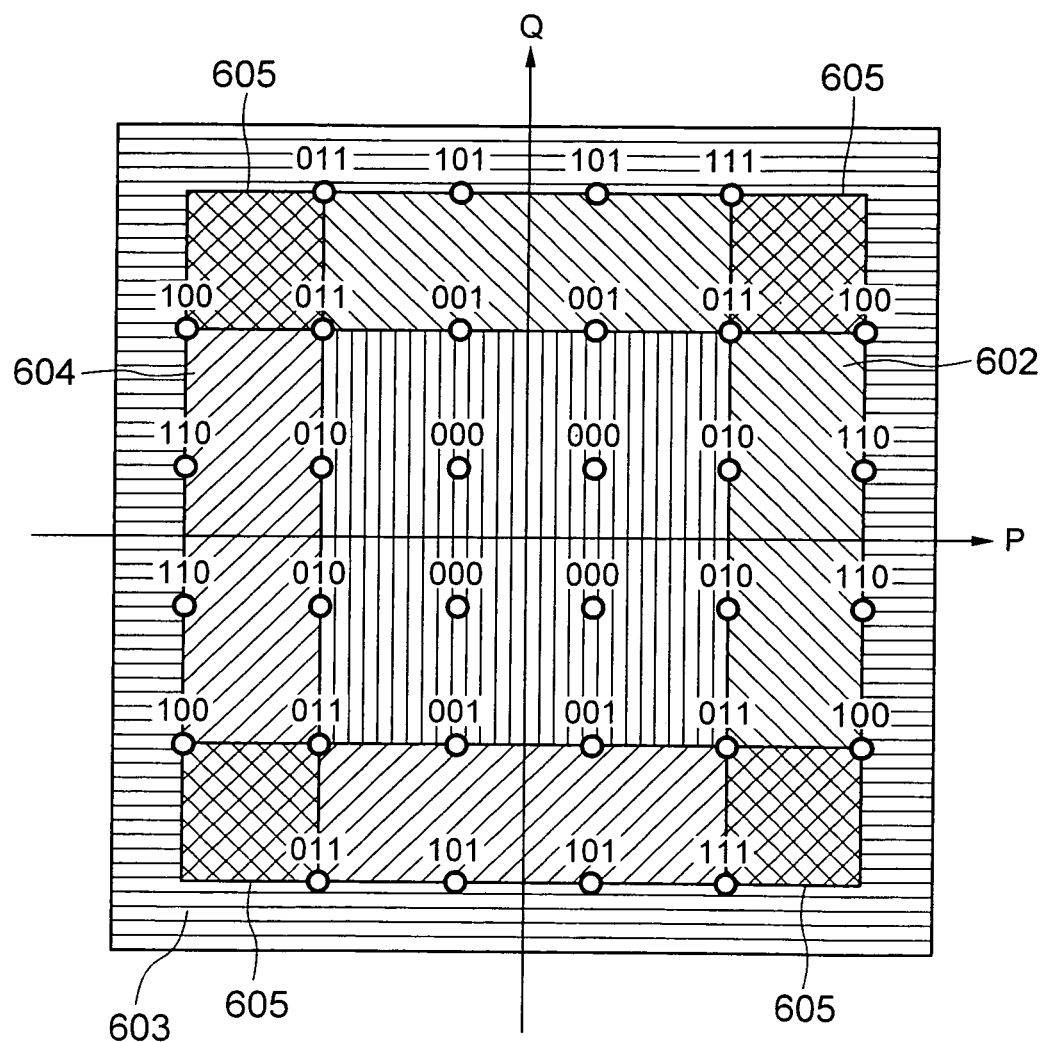
FIG. 11 is an illustration showing an example of LLR areas for 3SB (left end of 3 bits) of 32 QAM.
Figure 12A:
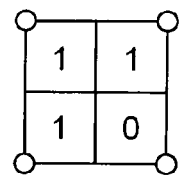
FIG. 12 is an illustration showing an example of special area present when a modulation method in which the symbol number is the odd power of two is used.
Figure 12B:
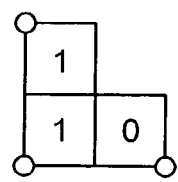
Figure 12C:
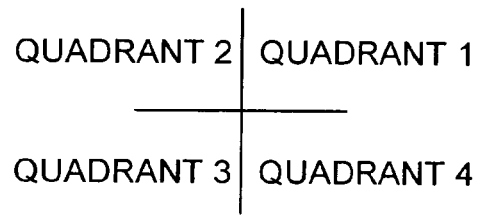
Figure 13:
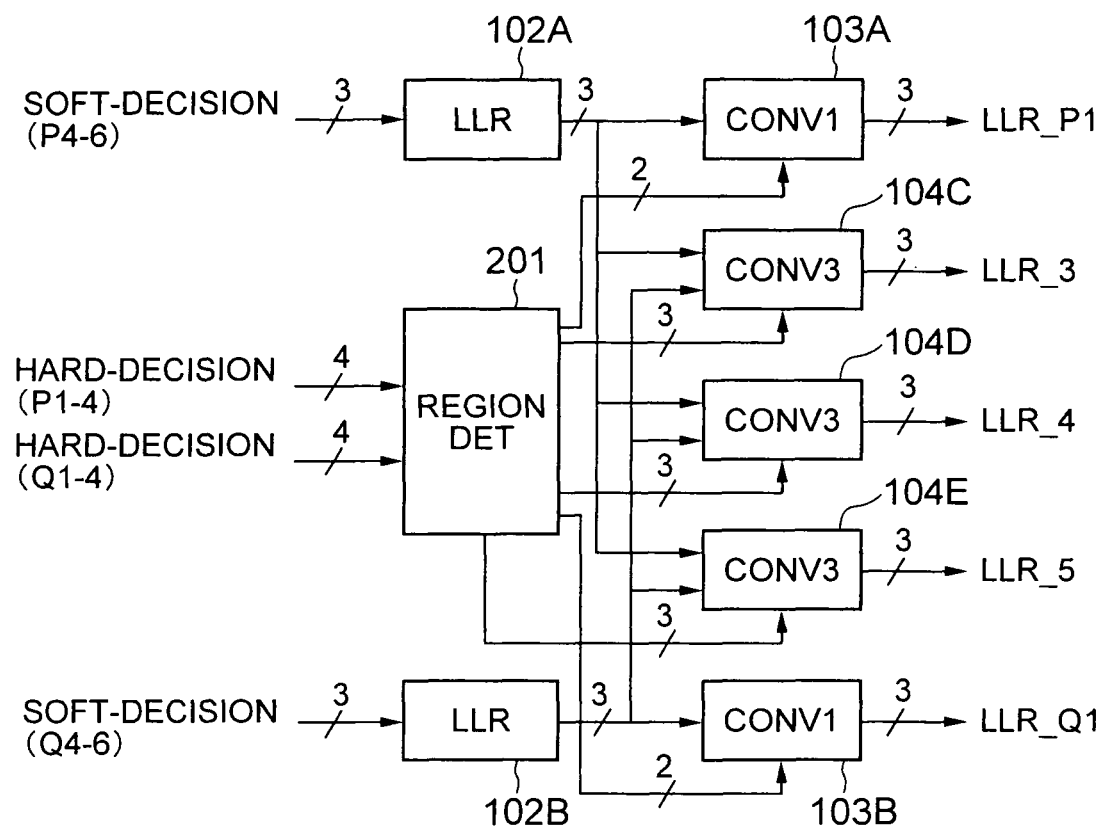
FIG. 13 is a block diagram showing another exemplary configuration of an LLR arithmetic circuit.
Figure 14:
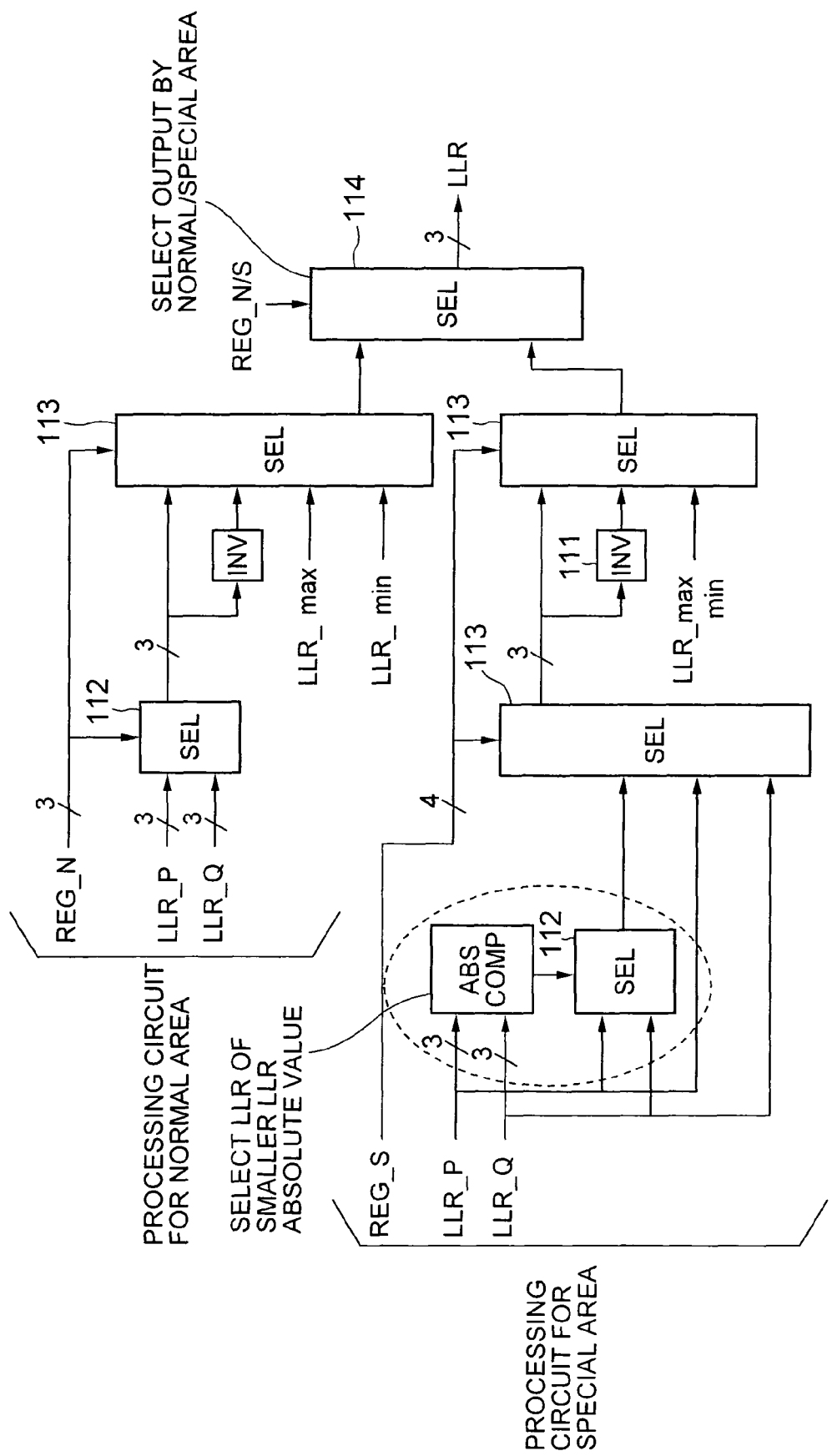
FIG. 14 is a block diagram showing another exemplary configuration of an LLR converter.

DESCRIPTION OF REFERENCE NUMERALS 101A, 101B area detection circuit
102A, 102B LLR circuit
103A, 103B, 104A, 104B LLR converter
110 selection circuit
111 inverter

What is claimed is:

1. A log likelihood ratio arithmetic circuit for calculating a log likelihood ratio from information of a coordinate of a reception signal point to be applied to a communication system using a quadrature amplitude modulation method, the log likelihood ratio arithmetic circuit comprising:
a first circuit that limits a scope within which a value of the log likelihood ratio varies corresponding to a position of the reception signal point to a range between adjacent signal points including a hard-decision threshold of a bit; and
a second circuit that does not vary the value of the log likelihood ratio outside of the range between the adjacent signal points.

2. The log likelihood ratio arithmetic circuit, according to claim 1, wherein the circuit sets a correspondence relationship between a bit and a symbol such that a bit error rate becomes minimum.

3. The log likelihood ratio arithmetic circuit, according to claim 1, wherein the circuit sets a correspondence relationship between a bit and a symbol when the modulation method has signal points of an even power of two in a Gray mapping.

4. The log likelihood ratio arithmetic circuit, according to claim 1, wherein the circuit sets a correspondence relationship between a bit and a symbol when the modulation method has signal points of an odd power of two in a quasi-Gray mapping in which a bit error rate becomes minimum.

5. The log likelihood ratio arithmetic circuit, according to claim 2, wherein the circuit outputs a soft-decision bit of 1CH included in the information of the coordinate of the reception signal point expressed in 2CH directly or in an inverted state, as a log likelihood ratio of an area where the log likelihood ratio varies.

6. The log likelihood ratio arithmetic circuit, according to claim 2, wherein the circuit outputs a maximum value or a minimum value of the log likelihood ratio, as a log likelihood ratio of an area where the log likelihood ratio does not vary.

7. The log likelihood ratio arithmetic circuit, according to claim 2, wherein, when there is an area where it is impossible to perform an area decision based only on information of a hard-decision bit of 1CH included in the information of the coordinates of the reception signal point expressed in 2CH, the circuit outputs a maximum value or a minimum value of the log likelihood ratio in an area where no bit error is caused, and a soft-decision bit of CH having lower likelihood in 2CH in an area where a bit error rate may be caused, under a condition in which the circuit limits the scope within which the value of the log likelihood ratio varies corresponding to the position of the reception signal point to the range between adjacent signal points including the hard-decision threshold of the bit.

8. The log likelihood ratio arithmetic circuit, according to claim 5, wherein a selection of the log likelihood ratio uses a result of an area decision performed based on information of the hard-decision bit of 1CH included in the information of the coordinate of the reception signal point expressed in 2CH.

9. The log likelihood ratio arithmetic circuit, according to claim 7, wherein a selection of the log likelihood ratio uses a result of an area decision by referring to a low-order bit of the hard-decision when there is an area where it is impossible to perform area decision based only on the information of the hard-decision bit of 1 CH included in the information of the coordinate of the reception signal point expressed in 2CH.

10. The log likelihood ratio arithmetic circuit, according to claim 5, wherein the log likelihood ratio is converted from a soft-decision bit into another value.

11. The log likelihood ratio arithmetic circuit, according to claim 1, wherein a value representing the reception signal point includes any value within a range where the reception signal point exists.

12. The log likelihood ratio arithmetic circuit, according to claim 1, wherein the circuit calculates the likelihood ratio arithmetic for an entirety of values within a range where the reception signal point exists.

13. The log likelihood ratio arithmetic circuit, according to claim 1, wherein the circuit performs a log likelihood ratio operation in which a number of symbols is an odd power of two.

14. A transmission apparatus comprising a log likelihood ratio arithmetic circuit for calculating a log likelihood ratio from information of a coordinate of a reception signal point to be applied to a communication system using a quadrature amplitude modulation method,
wherein the log likelihood ratio arithmetic circuit comprises:
a circuit that limits a scope within which a value of the log likelihood ratio varies corresponding to a position of the reception signal point to a range between adjacent signal points including a hard-decision threshold value of a bit; and
a circuit that does not vary the value of the log likelihood ratio outside of the range between the adjacent signal points.

15. A log likelihood ratio arithmetic method for calculating a log likelihood ratio from information of a coordinate of a reception signal point to be applied to a communication system using a quadrature amplitude modulation method, wherein a scope within which a value of the log likelihood ratio varies corresponding to a position of the reception signal point is limited to a range between adjacent signal points including a hard-decision threshold value of a bit, and
wherein the value of the log likelihood ratio does not vary outside of the range between the adjacent signal points.

* * * * *